United States Patent [19]

Borsheim

Best Available Copy

[11] E Re. 30,409

[45] Reissued Sep. 30, 1980

[54] POWERED CONTAMINANT EVACUATOR

[76] Inventor: Lewis A. Borsheim, 504 - 31st Ave. North, Fargo, N. Dak. 58102

[21] Appl. No.: 972,417

[22] Filed: Dec. 22, 1978

Related U.S. Patent Documents

Reissue of:

[64] Patent No.: 4,097,256
Issued: Jun. 27, 1978
Appl. No.: 798,857
Filed: May 20, 1977

[51] Int. Cl.[2] ..... B01D 41/00

[52] U.S. Cl. ..... 55/429; 55/430; 415/206

[58] Field of Search ..... 55/337, 400–409, 55/428–433, 466; 415/206, 203, 204

[56] References Cited

U.S. PATENT DOCUMENTS

| | | | |
|---|---|---|---|
| 583,513 | 8/1897 | Ward | 415/204 |
| 882,477 | 3/1908 | Neumann | 415/204 |
| 1,029,554 | 6/1912 | Neumayer | 415/204 |
| 2,244,165 | 6/1941 | MacFarland et al. | 55/471 |
| 2,325,221 | 7/1943 | Bretzlaff | 415/209 |
| 3,171,357 | 3/1965 | Egger | 415/206 |
| 3,670,480 | 6/1972 | Peterson | 55/430 |
| 3,696,591 | 10/1972 | Bennett et al. | 55/430 |
| 3,816,982 | 6/1974 | Regnault | 55/432 |
| 4,028,076 | 6/1977 | Fields | 55/431 |

*Primary Examiner*—Norman Yudkoff
*Attorney, Agent, or Firm*—Leo Gregory

[57] ABSTRACT

This invention relates to an improvement in an apparatus attached to an air cleaner such as of an internal combustion engine as in connection with a farm tractor wherein the contaminants drawn into the air cleaner are evacuated to the atmosphere therefrom by said apparatus wherein the improvement consists in having the apparatus continuously operative, providing a positive evacuation of contaminants and comprising a relatively small sized motor driving an impeller which receives contaminants from the air cleaner and evacuates or expells the same and embodies the use of a plurality of vanes whereby the engine associated with the air cleaner is prevented from drawing a reverse flow of air through the exhaust passage of the apparatus and the vanes serve as closure means whereby there is no open passage through the apparatus to the cleaner and thus only a low powered impeller is required to expel the contaminants received. The air cleaner may be otherwise used than in connection with an internal combustion engine.

11 Claims, 7 Drawing Figures

FIG. 1
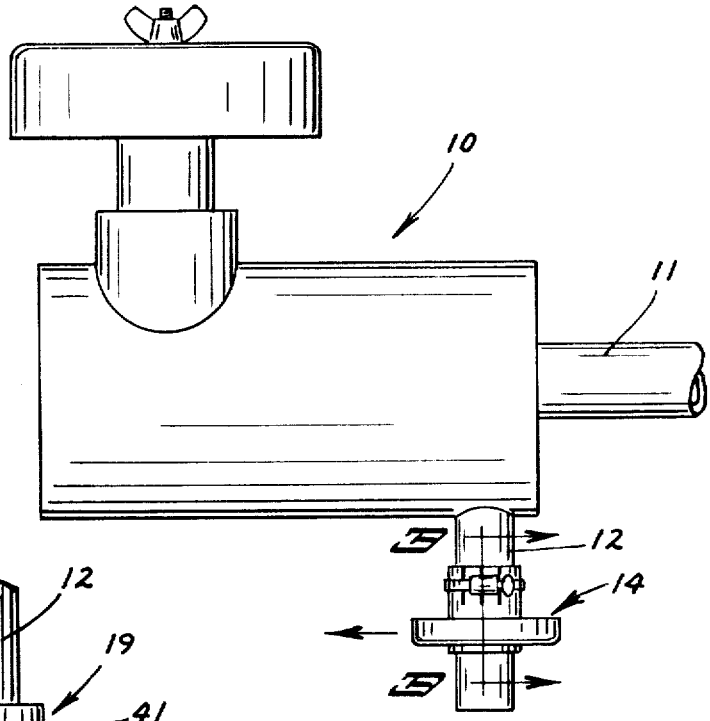
FIG. 2
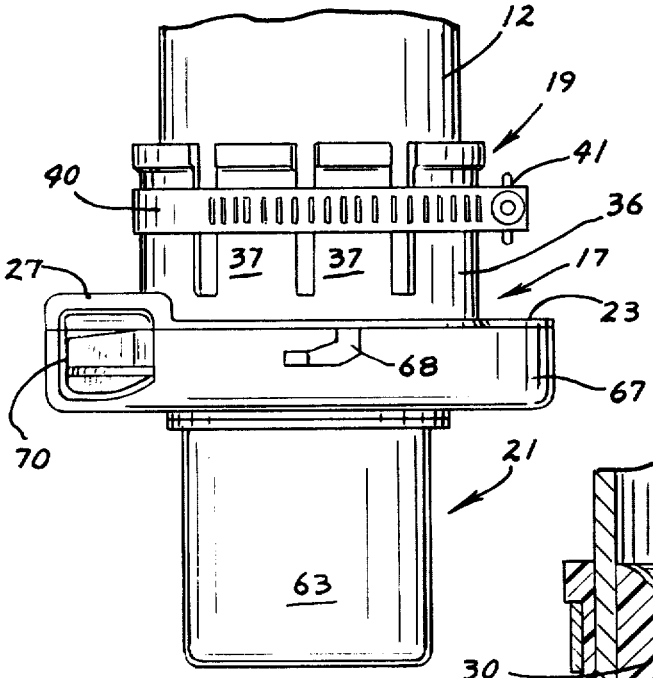
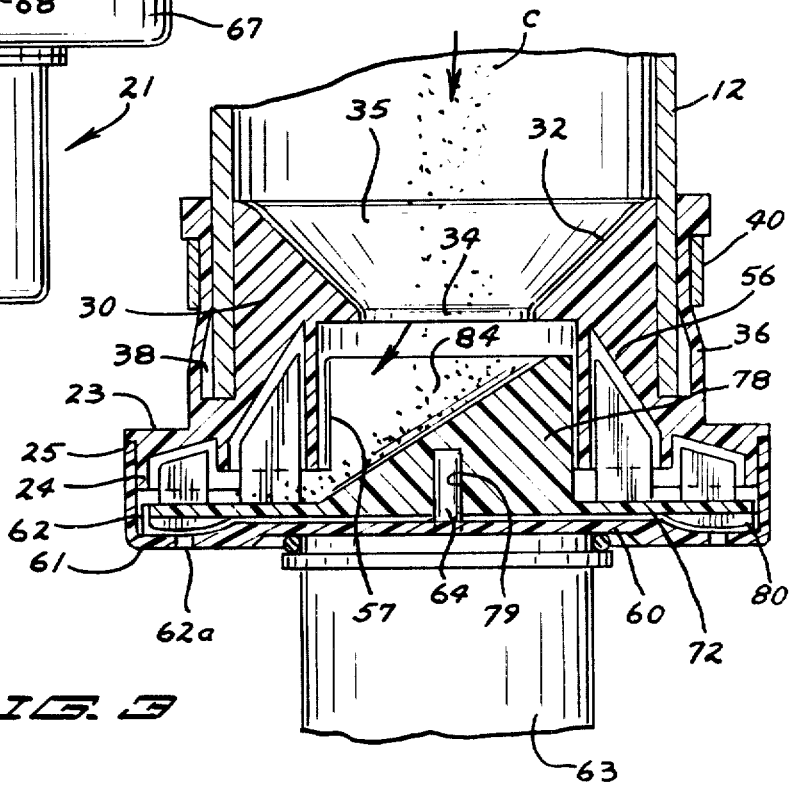
FIG. 3

POWERED CONTAMINANT EVACUATOR

Matter enclosed in heavy brackets [ ] appears in the original patent but forms no part of this reissue specification; matter printed in italics indicates the additions made by reissue.

BACKGROUND AND SUMMARY OF THE INVENTION

The invention herein relates to a powered evacuating apparatus adapted to receive and discharge contaminants from an air cleaner such as may be mounted on the air intake pipe of a tractor and said apparatus is particularly arranged to positively discharge said contaminants. It will be understood that the air cleaner may be otherwise employed.

The known prior art discloses a commonly used exhaust control valve element for the discharge of solids from an air cleaner comprising an elastic or flexible pair of lips which expand to open and discharge contaminants by gravity when the same have accumulated sufficiently. However, said pair of lips under adverse temperature conditions tend to stiffen and in relying wholly upon flexibility to open for the discharge of solids and to respond to the suction of the engine in closing rapidly, the lips fail to open readily and in failing to close rapidly they permit the engine to draw a stream of air therethrough inwardly through the outlet of the air cleaner and thus air not having the full benefit of the air cleaner passes into the engine.

It is an object of this invention to provide a power operated contaminant evacuating apparatus in connection with an air cleaner which positively discharges contaminants from said air cleaner and prevents any reverse flow of air therethrough to said air cleaner.

It is another object of this invention to provide an apparatus of relatively small size which is attached to the outlet pipe of the air cleaner to positively evacuate contaminants gathered or collected therein.

It is a further object of this invention to provide an evacuating apparatus for an air cleaner which has no reverse path for air flow between its discharge outlet and its intake of contaminants from said air cleaner.

It is another object of this invention to provide a contaminant evacuating apparatus for an air cleaner comprising discharge means which close the discharge outlet of the apparatus at the time it receives for discharge contaminants from said air cleaner.

It is a more specific object of this invention to provide an evacuating apparatus for an air cleaner comprising a motor driven impeller, a housing having said impeller disposed therein and having an intake of contaminants from said air cleaner through said impeller and evacuating contaminants by means of the blades of said impeller, said blades being arranged and constructed to effectively prevent any reverse flow of air through the apparatus to the air cleaner.

These and other objects and advantages of the invention will be set forth in the following description made in connection with the accompanying drawings in which like reference characters refer to similar parts throughout the several views and in which:

FIG. 1 is a view in side elevation with a portion broken away showing the invention herein in an operating position;

FIG. 2 is a broken view in side elevation on an enlarged scale of the invention herein;

FIG. 3 is a fragmentary view in vertical section on an enlarged scale taken on line 3—3 of FIG. 1 as indicated;

DESCRIPTION OF A PREFERRED EMBODIMENT

Figure 5:
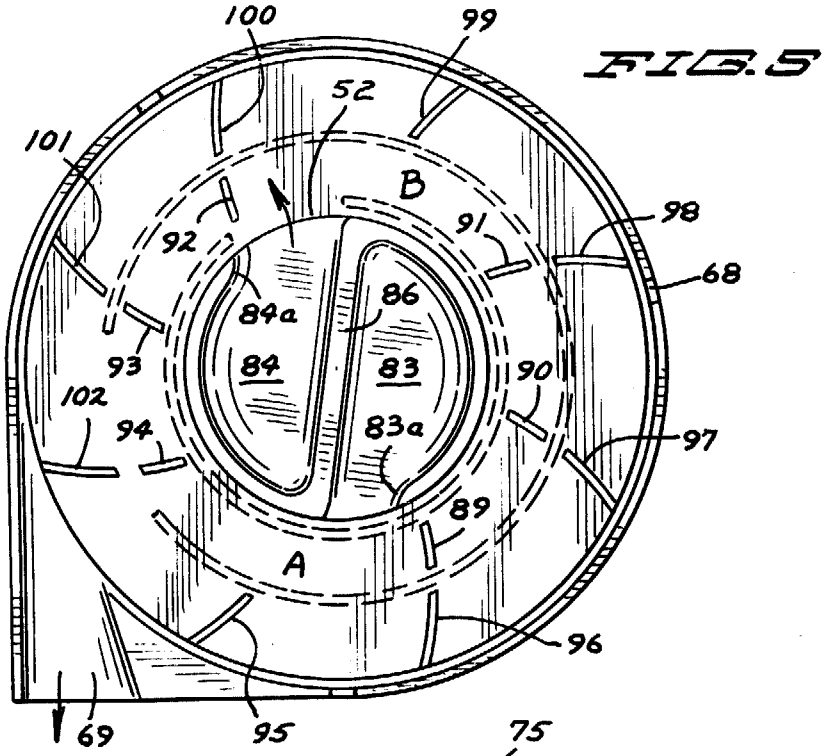
FIG. 5 is a top plan view of another portion of the housing of the invention herein which is a counterpart and complementary to the structure of FIG. 4.
Figure 7:
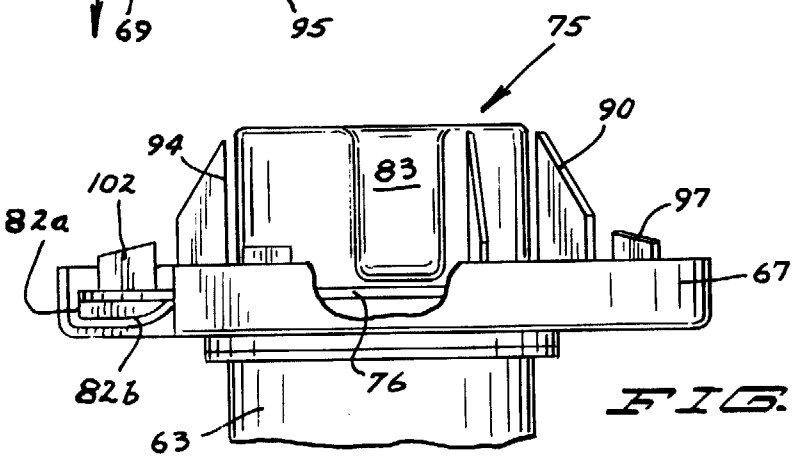
FIG. 7 is a fragmentary view in side elevation of the structure of FIG. 5.

Referring to the drawings and more particularly to FIG. 1, an air cleaner 10 is shown of a type known in the prior art and the same is mounted upon an air intake pipe 11 which as herein indicated provides filtered air as to an internal combustion engine not here shown and the same may also be otherwise employed to supply filtered air.

The invention herein relates to the apparatus or device 14 which comprises a power operated contaminant evacuator which is mounted upon the outlet or discharge pipe 12 of said air cleaner for a positive discharge from said air cleaner of contaminants collected therein.

Said device 14 comprises an outer housing 17 consisting of two complementary interlocking housing portions 19 and 21.

The upper portion 19 of said housing has for its external construction an annular horizontal flange 23 having an annular inset flange or wall 24 disposed at right angles thereto depending therefrom in operating position and forming therebetween outwardly thereof an annular projecting shoulder 25. Said horizontal flange has a tangential projecting outlet portion as outlet 27 and in connection therewith said flange 24 has an opening 28 formed therein between the separated ends 24a and 24b thereof.

Upstanding centrally of said body portion 19 is a cylindrical wall 30 having an inwardly inclined annular wall 32 having a central opening or bore 34 therein and said wall forms a contaminant receiving means or chamber 35. Projecting outwardly of said flange 24 are spaced locking lug members 26.

Spaced about said cylindrical wall 30 and disposed substantially thereabout is a wall 36 comprising a plurality of separated upstanding segments 37 sufficiently flexible to yield to the pressure of the clamp strap member 40 and formed between said walls 30 and 36 is a passage 38.

In mounting said device onto said outlet pipe 11, the wall of said outlet pipe is disposed into said passage 38 and the clamping member 40 is tightened by operating the thumb screw 41.

Figure 4:
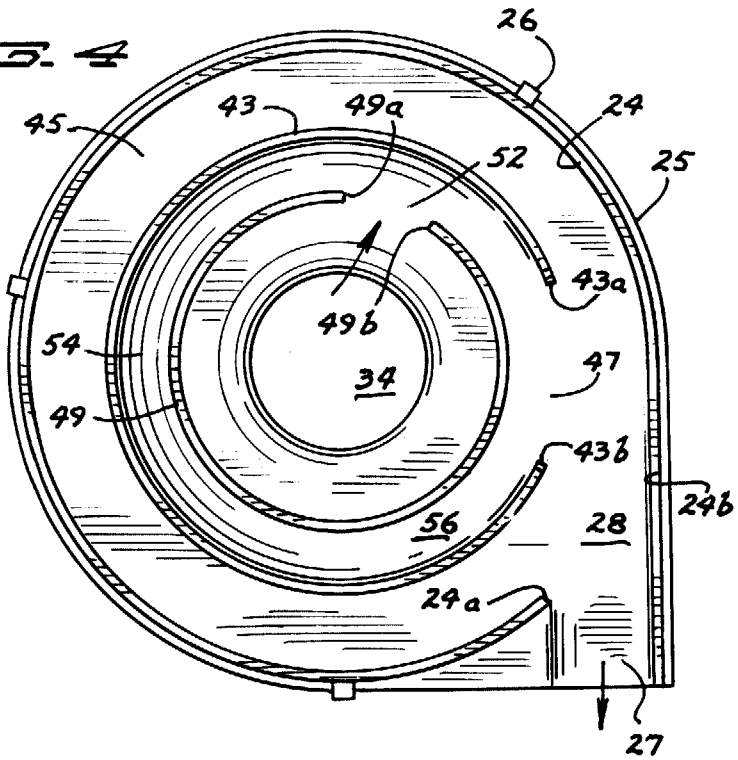
FIG. 4 is a top plan view on an enlarged scale showing one portion of the housing of the invention herein.
Figure 6:
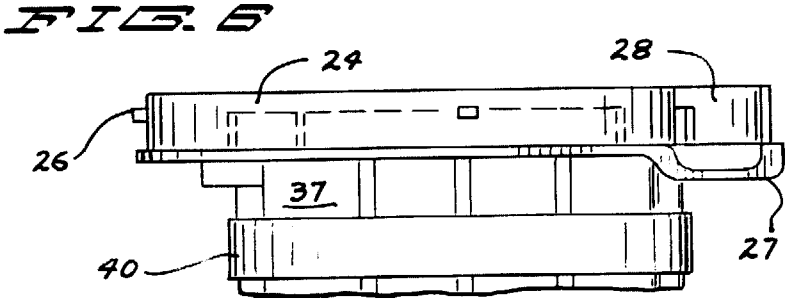
FIG. 6 is a fragmentary view in side elevation of the structure of FIG. 4.

Referring now particularly to FIGS. 3 and 4, the inner structure of portion 17 will be described.

Spaced inwardly of said flange or wall 24 is a corresponding wall 43 parallel thereto forming a passage 45 therebetween. Said wall 43 has an opening of outlet 47 therein between its end portions 34a and 34b. Spaced inwardly of said wall 43 and parallel thereto is a wall 49 which is recessed substantially below the wall 43 and has an opening or outlet 52 therein between its end portions 49a and 49b. Formed between said walls 43 and 49 is a recessed passage 54 having an inclined wall 56 extending from said wall 43 downwardly to the recessed bottom of said wall 49 as shown in FIG. 3. Said wall 49 has a chamber 57 formed therein as indicated in FIG. 4 into which said bore or opening 34 opens directly. Said wall 49 except for its opening 52 encircles said bore 34.

The openings 47 and 52 are offset in a staggered relationship or misaligned circumferentially as will be later described hereinafter.

Described now will be the housing portion 21 which comprises a circular plate member 60. Carried as a projection centrally outwardly of said plate member is an electric motor 63 of conventional design suitable for the purposes herein. Preferably said motor will be of a design to rotate a shaft on the order of 6,000 rpm and will have a line running to a suitable power source. Extending through said plate member 60 is the drive shaft 64 of said motor.

Upstanding about said plate member 60 is a flange or wall 67 corresponding to and designed to receive therein said wall 24 and supported thereon will be said annular shoulder 23. Said wall has angled slots 68 therein to receive the lugs 26 and has locking engagement with said lugs by a slight relative circumferential movement of the housing portions 19 and 21.

An annular portion 61 of said plate member 60 has a shallow channel 62 formed therein and a tangential portion of said plate member and of said wall and of said channel form an outlet 69 corresponding to said outlet 27 in being complementary therewith and forms therewith a discharge port 70 as indicated in FIG. 2. Said channel 62 has a plurality of apertures 62a extending therethrough directly outwardly to the atmosphere.

Seated upon said plate member 60 as shown in FIG. 3 is a contaminant discharging or evacuating means shown here in the form of an impeller 75.

Said impeller comprises a circular base plate member or disc 76 having an upstanding hub portion 78 and having an aperture 79 extending upwardly thereinto from the bottom thereof to receive said motor shaft 64 in a pressure fit. Depending from or extending downwardly of said plate member 76 are a plurality of circumferentially spaced vanes 80 which are formed to conform to the cross-sectional configuration of the passage or channel 62. Said vanes may be variously formed but as here shown in plan are indicated as having a straight vertical outer edge portion 82a and having an inwardly curved bottom wall 82b.

Said hub portion 78 has formed therein as shown in FIGS. 3 and 5 from the top to the bottom thereof a pair of oppositely or reversely declining ramp or chute portions 83 and 84 separated by what may be regarded as being a diametrical wall 86. Disposed circumferentially about said hub portion are a plurality of upstanding vanes 89–94 conforming in plan to the cross-sectional configuration of the channel or passage 54 and having small clearance therebetween. As here presented the vane 89 and the vane 92 are each positioned in vertical alignment with the chute walls 83a and 84a and with the other vanes are equally spaced apart except that there is a relative double spacing between the vanes 89 and 94 and between the vanes 91 and 92 which spacing will be further described.

Equally spaced circumferentially and upstanding from said plate member 78 and outwardly of said vanes 89–94 are vanes 95–102 and the same are aligned substantially radially with the vanes 89–94 with the exception that vanes 95 and 99 are in effect spaced intermediate the distance between the vanes 89 and 94 and 91 and 92.

Between the vanes 89 and 94 taken with the vane 95 is a pocket or passage area designated as A and between the vanes 91 and 92 taken with the vane 99 is a like pocket or passage area indicated as B. These pocket areas are larger than the areas between the other like related vanes as will be readily noted in FIG. 5.

The vanes 89–94 are spaced outwardly from the hub 78 sufficiently to accommodate the wall 49 with very small clearance. The vanes 89 and 94 and 95–102 are respectively spaced apart radially to accommodate the wall 43 therebetween with but small clearance. The vanes 95–102 have very small clearance with respect to the adjacent walls of the channel 62.

OPERATION

The manner in which the invention herein is installed in operating position is above described.

An air cleaner of the type indicated at 10 will separate and collect from the air passing therethrough the entrained contaminants. The invention herein represents an improvement in the art of evacuating contaminants from an air cleaner by doing so on a continuous operating basis having its own power source and positively evacuating the contaminants from the air cleaner to effectively prolong the use of the filter elements therein. Further, the invention herein is particularly adapted to prevent any reverse flow of air which may be drawn by the suction of the engine through an outlet intended for the discharge of contaminants.

Referring to FIGS. 3–5 and particularly to FIG. 5, contaminant C is gravity fed into the chamber 35 and into the chamber 57 through the bore or opening 34 and down one of the chutes 83 or 84, chute 84 being shown in FIGS. 3 and 5.

Although the contaminants are gravity fed, the spinning action of the impeller 75 driven by the motor 63 creates a low pressure area within the chambers 35 and 57 to accelerate the movement of the contaminants being fed thereinto.

Referring to FIG. 5, the contaminants pass into the passage area B which as above described with the omission of a vane provides a substantial area to accommodate large particles such as blades of straw, grass and the like and the size of this area prevents such particles from becoming packed so as not to become readily discharged through the outlet 70. Prior art devices may readily discharge dust and the like but become clogged or jammed in attempting to pass large particles such as blades of straw. It will be noted that the outlet 70 is a composite of the superposed outlets 27 and 69 indicated in FIGS. 4 and 5.

With reference to FIG. 4, preferably the edge 49b will be a cutting edge. Thus as contaminants pass out of the chutes 83 and 84 into the areas A and B, as the case may be, the vanes 89 and 92 respectively will impact contaminants against said edge to reduce the contaminants in size.

It will be noted that at the time contaminants are passing into the area B, referring to FIG. 5, that the vanes 100 and 101 effectively prevent reverse flow of air through the passage 45 and the vanes 94 and 93 prevent the reverse flow of air through the passage 54. Thus there is no open communication between the outlet from the air cleaner and the discharge outlet 70 at any given time.

Any open communication between the outlet of the air cleaner and the discharge outlet 70, with the suction of the engine to which the air cleaner is connected over powering the rotation of the impeller 63, said impeller would be reversely driven and a stream of air would be sucked into the outlet 70 into and through the air cleaner. In many prior art devices this becomes a substantial problem and is effectively dealt with in the apparatus herein.

The vanes are all designed with sufficiently close clearance with regard to adjacent walls that their respective passages are sealed against the passage of any significant quantity of air bypassing the vanes.

The motor 63 in having its own power source operates continuously independently of the operation of the engine to which filtered air is being fed. Thus there is a continuous positive discharge of contaminants from the air cleaner during the full time that the invention herein is operating.

When the passage areas A and B approach the discharge outlet 70 centrifugal action effectively moves the contaminants from the areas A and B into the outer passage 45 as between vanes 99 and 100 and 95 and 96 as the case may be and the forward motion of the impeller effectively evacuates these passages in their entirety. It is noted here as indicated by arrows that the impeller rotates in a counterclockwise position. The vanes 80 in the channel 62 draw a stream of air through the apertures 62a which assist in the discharge of contaminants through the discharge outlet 70.

Relating the structures of FIG. 5 and FIG. 4, the circumferentially staggered relationship of the outlet 52 and 47 in the direction of discharge outlet 27 or the composite discharge outlet 70 as in FIG. 2 is such that when an area A or B is discharging contaminants through the outlet 70, the outlet 52 is blocked by a vertical wall portion of the hub 78. Thus at the intervals of discharge of contaminants from the outlet 70, in addition to the prevention of reverse flow of air by the vane structure described, communication is blocked between the air cleaner to which the invention herein is attached and communication through the passages of the evacuating apparatus.

The invention has been extensively tested under various operating conditions and has proved to be very successful in the testing efforts conducted.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A positive discharge evacuating apparatus, having in combination a housing, receiving means within said housing, including, an annular chamber having an outlet, a passage within said housing about said chamber having an outlet, a discharge passage within said housing about said last mentioned passage having a discharge outlet, said outlet of said first mentioned passage and of said chamber being misaligned circumferentially, discharge means carried by said housing cooperating with and being complementary to said receiving means comprising, an impeller, driving means carried by said housing driving said impeller,

[a hub portion of] *means carried by* said impeller being disposed into said chamber, said [hub portion having a pair of oppositely disposed discharge chutes which alternately] *means* provide communication between said chamber and said discharge passage, vanes carried by said impeller upstanding therefrom disposed in said first mentioned passage, a plurality of vanes carried by said impeller upstanding therefrom disposed in said discharge passage, a pair of opposed spaced pairs of said vanes in said first mentioned passage define pockets respectively alternately in register with said outlet of said chamber, and

[said] *the* other vanes of said [other] *first* mentioned passage and said vanes of said discharge passage obstructing communication between said outlet of said chamber and said outlet of said discharge passage when [one of] said [discharge chutes of said chamber] *means* communicates with said discharge passage.

2. A positive discharge evacuating means in connection with an air cleaner, having in combination a housing, means removeably attaching said housing to the outlet of said air cleaner, said housing having a cylindrical body portion, a chamber in said body portion,

[a passage from said air cleaner into said chamber,] said chamber having an outlet,

[a plate member underlying said chamber]

means rotatably supporting and driving said plate member, a hub portion of said plate member extending into said chamber alternately opening and closing said outlet in said chamber, said hub portion having chutes formed therein to receive contaminants from said air cleaner for discharge through said outlet in said chamber, a plurality of vanes upstanding from said plate member circumferentially spaced about said hub portion, a plurality of vanes upstanding from said plate member disposed circumferentially about said first mentioned vanes, an annular wall depending from said body portion disposed between said first and second mentioned vanes, an outlet in said annular wall in a circumferentially misaligned position with respect to said outlet of said chamber, an annular passage in said body portion receiving said last mentioned vanes, a discharge outlet from said housing in a non-aligned position with respect to said outlet in said mentioned wall, said chutes in said hub portion being relatively positioned with respect to said discharge outlet whereby said chutes are non-aligned with said outlet of said chamber when contaminants are being discharged through said discharge outlet from said housing, and said vanes being positioned to obstruct air passage from said discharge outlet of said housing with said outlet of said chamber when contaminants are being discharged through said discharge outlet.

3. The structure set forth in claim 2, wherein said driving means comprises a motor carried by said housing and drives said plate member.

4. The structure set forth in claim 2, including a plurality of vanes depending from said plate member, an annular passage in said housing in opposed relation to said first mentioned annular passage and receiving said last mentioned vanes.

5. The structure set forth in claim 4, including a plurality of apertures extending from said last mentioned annular passage communicating with the atmosphere.

6. A positive discharge evacuating means in connection with an air cleaner, having in combination a housing, means removably attaching said housing to the outlet of said air cleaner, contaminant receiving means within said housing having communication with said outlet of said air cleaner, said receiving means comprising, an annular chamber having an outlet, a passage about said chamber having an outlet, a discharge passage about said last mentioned passage having a discharge outlet, said outlet of said first mentioned passage and of said chamber being misaligned circumferentially, contaminant discharging means cooperating with and being complementary to said contaminant receiving means comprising, an impeller comprising a plate member and an upstanding hub portion, driving means carried by said housing driving said plate member, said hub portion of said impeller being disposed into said chamber, said hub portion having a pair of oppositely disposed discharge chutes which alternately provide communication between said chamber and said discharge passage, a plurality of vanes upstanding from said plate member disposed in said first mentioned passage, a plurality of vanes upstanding from said plate member disposed in said discharge passage, a pair of opposed spaced pairs of said vanes in said first mentioned passage define pockets to receive contaminants from said chamber, pair of said opposed pairs of said vanes being respectively alternately in register with said outlet of said chamber, and said other vanes of said first mentioned passage and said vanes of said discharge passage obstructing communication between said outlet of said chamber and said outlet of said discharge passage when one of said discharge chutes is aligned with said outlet of said chamber.

7. The structure set forth in claim 6, wherein said opposed pairs of vanes in said *first* mentioned passage aligned with said outlet of said chamber are spaced further apart than the [other] *others* of said *plurality of* vanes in said first mentioned passage.

8. The structure set forth in claim 6, wherein all of said vanes respectively have sealing engagement with the adjacent walls of their respective passages.

9. The structure set forth in claim 6, wherein an annular channel in said housing underlies said plate member in alignment with said discharge passage, vanes carried by said plate member are disposed in said underlying channel, and said channel has a plurality of apertures therethrough to the atmosphere.

*10. A positive discharge evacuating means in connection with an air cleaner, having in combination*

*a housing,*

*means removeably attaching said housing to the outlet of said air cleaner,*

*said housing having a cylindrical body portion,*

*a chamber in said body portion,*

*a passage from said air cleaner into said chamber,*

*said chamber having an outlet,*

*a plate member underlying said chamber,*

*means rotatably supporting and driving said plate member,*

*means carried by said plate member extending into said chamber alternately opening and closing said outlet in said chamber,*

*said last mentioned means passing contaminants from said air cleaner for discharge through said outlet in said chamber,*

*a plurality of vanes upstanding from said plate member circumferentially spaced about said last mentioned means,*

*a plurality of vanes upstanding from said plate member disposed circumferentially about said first mentioned vanes,*

*an annular wall depending from said body portion disposed between said first and second mentioned vanes,*

*an outlet in said annular wall in a circumferentially misaligned position with respect to said outlet of said chamber,*

*an annular passage in said body portion receiving said last mentioned vanes,*

*a discharge outlet from said last mentioned passage in a non-aligned position with respect to said outlet in said chamber,*

*said last mentioned means being relatively positioned with respect to said discharge outlet whereby said last mentioned means closes said outlet of said chamber when contaminants are being discharged through said discharge outlet from said last mentioned passage, and*

*said vanes being positioned to obstruct air passage from said discharge outlet of said last mentioned passage with said outlet of said chamber when contaminants are being discharged through said discharge outlet of said chamber.*

*11. A positive discharge evacuating means in connection with an air cleaner, having in combination*

*a housing,*

*means removeably attaching said housing to the outlet of said air cleaner,*

*said housing having a cylindrical body portion,*

*a chamber in said body portion,*

*a passage from said air cleaner into said chamber,*

*said chamber having an outlet*

*a plate member underlying said chamber,*

*means rotatably supporting aid driving said plate member,*

*means carried by said plate member extending into said chamber alternately opening and closing said outlet in said chamber,*

*said last mentioned means passing contaminants from said air cleaner for discharge through said outlet in said chamber,*

*a plurality of vanes upstanding from said plate member circumferentially spaced about said means,*

*an annular passage in said body portion receiving said vanes,*

*a discharge outlet from said last mentioned passage in a non-aligned position with respect to said outlet in said chamber,*

*said last mentioned means being relatively positioned with respect to said discharge outlet whereby said last mentioned means closes said outlet of said chamber when contaminants are being discharged through said discharge outlet from said last mentioned passage, and*

*said vanes being positioned to obstruct air passage from said discharge outlet of said last mentioned passage with said outlet of said chamber when contaminants are being discharged through said discharge outlet of said chamber.*

* * * * *